United States Patent Office 3,262,722
Patented July 26, 1966

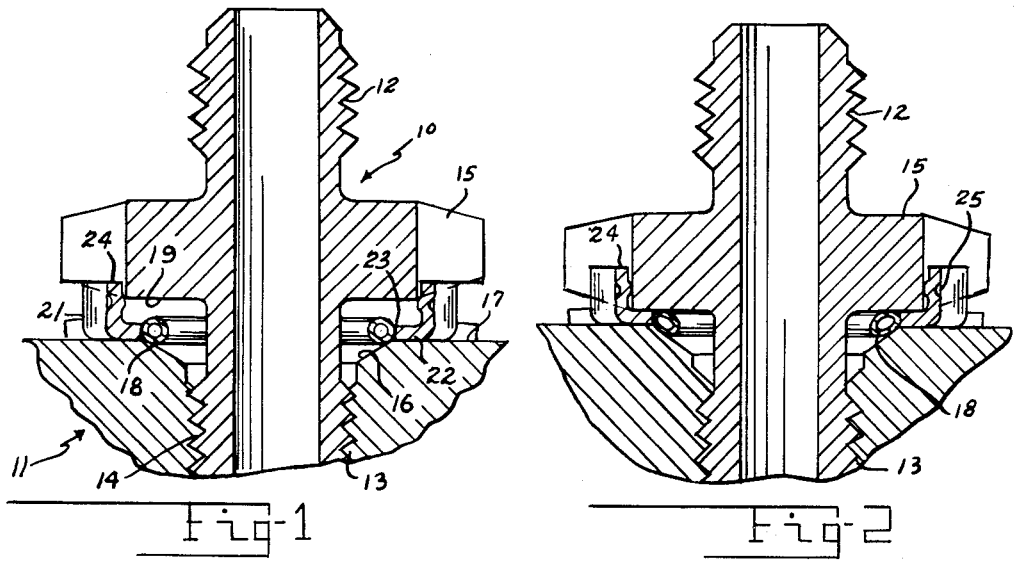
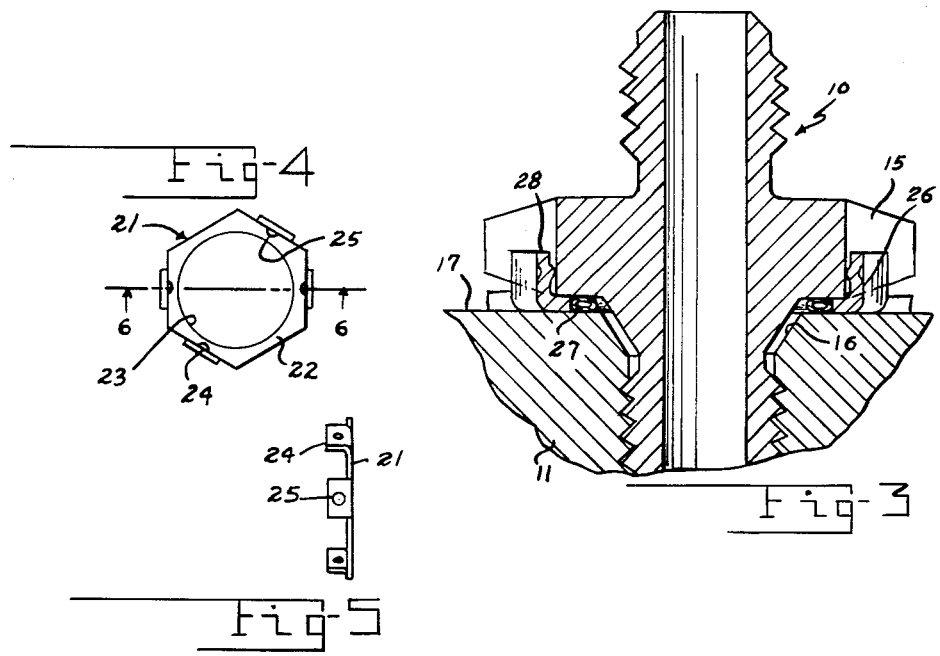
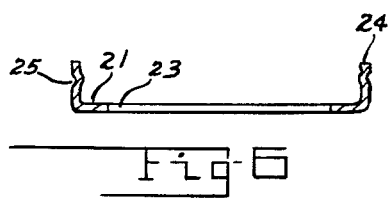

3,262,722
COUPLING HAVING AN O-RING RETAINER
Robert L. Gastineau, Dayton, Ohio, and Julian N. Andrews, Los Angeles, Calif., assignors to United Aircraft Products, Inc., Dayton, Ohio, a corporation of Ohio
Filed Nov. 19, 1964, Ser. No. 412,399
4 Claims. (Cl. 285—212)

This invention relates to sealing assemblies including an O-ring seal and retainer therefor, and particularly to retainers adapting hollow metallic O-rings to special installations.

Hollow metallic O-rings find widespread use in installations where problems of sealing due to temperature and pressure extremes, or to corrosion, are severe. In use the ring customarily is installed in a groove between mating flanges, the groove serving the purpose of providing a positive back-up means for the ring as well as defining by its depth a predetermined limit of compression to which the ring may be subjected upon closing of the joint. These two factors, positive back-up and predetermined compression loading are considered critical in the use of hollow metallic O-rings.

The instant invention has in view the obviating of the need for a grooved surface in the use of a metallic O-ring, it being proposed to provide a separable retainer incorporating in itself both the mentioned features of predetermined compression loading and positive back-up.

According to a feature of the invention a retainer and O-ring may comprise a unitary assembly, and, the invention has particularly in view the adapting of special fittings, such as AN and MF fittings, to the use of hollow metallic O-rings without machining or otherwise modifying the fitting or the body to which it is mounted.

A particular object of the invention is to provide a retainer as described which incorporates in itself means yieldingly to grip a fitting to which it is applied in a manner to facilitate installation of the fitting and the O-ring assembled thereto.

Other objects and structural details of the invention will appear from the following description when read in connection with the accompanying drawing, wherein:

FIG. 1 is a fragmentary view of an AN type fitting in the process of being installed in a supporting body, a metallic O-ring adaptation in accordance with an illustrated embodiment of the invention being shown therein;

FIG. 2 is a view similar to FIG. 1, showing the fitting fully installed;

FIG. 3 is a view similar to FIG. 2, showing a modified arrangement of seating the O-ring upon the supporting body;

FIG. 4 is a top plan view of an O-ring retainer as used in FIGS. 1–3;

FIG. 5 is a view in side elevation of the retainer of FIG. 4; and

FIG. 6 is a view in cross section taken substantially along the line 6—6 of FIG. 4, and enlarged relatively to FIG. 4.

Referring to the drawings, an AN type fitting 10 is shown in connection with a boss or mounting body 11. As indicated, the fitting is comprised of a tubular body portion having oppositely disposed externally threaded nipple portions 12 and 13. The latter is received in a threaded opening 14 in the body 11. An intermediately disposed flange 15 projects radially from the body of the fitting. Threaded opening 14 in the body 11 has a tapered lead-in surface 16 which connects threaded opening 14 to a flat planar surface 17 on the exterior of the body 11.

Sealing between fitting 10 and body 11, around nipple 13, is accomplished by a hollow thin walled metallic O-ring 18 adapted to be compressed upon taper surface 16, as shown in FIG. 1, or upon planar surface 17 as shown in FIG. 3. Compression of the O-ring is effected through a flat under surface 19 on the flange 15. Adapting the O-ring to the installation is a retainer member 21. This is a member having a flat body portion 22, ring-like in shape, in the center of which is a through longitudinal opening 23. The outer periphery of the retainer 21, or portions thereof, is raised to define a plurality of upstanding circumferentially spaced apart tabs 24. The retainer is predetermined in its dimensions to cause the upturned tabs 24 closely to receive fitting flange 15 therein. Similarly, the diameter of interior opening 23 is predetermined to accept the O-ring 18 with a relatively close fit, with both the diameter of such opening and the outside diameter of the O-ring being selected or predetermined to locate the ring either in line with taper surface 16 (FIG. 1) or in line with planar surface 17 (FIG. 3). The cross sectional diameter of the O-ring exceeds the thickness or height of body portion 22 of the retainer.

In the use of the O-ring and the retainer, the two may advantageously be appplied to the fitting 10 as a unit. Thus, the retainer 21 is slipped over nipple 13 in a direction to bring the upturned tabs 24 into embracing relation to the periphery of flange 15 and to bring body portion 22 into contacting relation to the under surface 19 of the flange. Carrried with the retainer is the O-ring 18 which assumes a position held within opening 23 concentric with the longitudinal axis of the fitting 10. The fitting then is mounted to the body 11 by inserting nipple 13 into opening 14 and screwing down the fitting, as by application of a wrench to the periphery of the flange 15. In the course of such movement the O-ring 18 is caused to seat on the body 11, and, as inward motion of the fitting continues, the O-ring is compressed. A limit of compression is defined by contact of fitting surface 18 with the body portion 22 of the retainer. Fully installed, the parts of the joint may assume the position as shown in FIG. 2 or FIG. 3. As indicated, the O-ring is compressed from a round to a generally oval configuration, from which shape it attempts by its natural resilience to restore itself to a normal roundness. The inner periphery of the retainer provides a back-up wall for the ring precluding overstressing thereof and assisting in the providing of a reactant surface whereby the ring tends more aptly to restore itself to a round shape. The tabs 24 closely engage the flange 15, as noted, so that both the retainer and its contained O-ring are held against relative motion in a lateral sense, fixing the position of the O-ring relative to the longitudinal axis of the fitting.

The flange 15 conventionally has a hexagonal shape facilitating engagement by a wrench. The retainer may have a complementary hexagonal configuration, as shown particularly in FIG. 4, with a tab 24 projecting upwardly from each side of the retainer body. Alternatively the retainer may have a circular exterior outline, and, if desired, a continuous circular lip performing the function of the tabs 24.

The fitting 10 is identically constructed to either end thereof with the upper surface of the flange 15 being formed with a planar surface corresponding to the planar surface 19 on the underside. Either end of the fitting may have a retainer 21 and contained O-ring applied thereto in the manner illustrated. The height of the tabs, or circular lip, is such as not to preclude access to the flange periphery by a wrench.

The AN fitting of the illustration is one adapted by its manufacturer to use in an installation wherein sealing around the inwardly projected nipple is achieved by an elastomeric ring adapted to be wedged into and on tapered surface 16 by an advancing surface 18. The instant invention provides a facile and simplified means of adapting such a fitting, either in a new or existing installation, to use with a metallic O-ring. Sealing requirements may be such, on account of extremely hot temperatures or pressures, or both, or on account of conditions of rapid deterioration due to corrosion, to make elastomeric and like rings unsuitable for use.

In accordance with a feature of the invention each upstanding tab 24 is formed with an inwardly facing rounded protuberance 25 effected by suitably impressing or dimpling the reverse side thereof. In engaging the flange 15 the protuberances 25 are adapted to stress the tabs 24 in a manner to achieve a more positive gripping of the flange by the retainer. A yielding form of detent thus is established by which it may be insured that an O-ring retainer assembly may be installed on and held to a fitting 10 in the course of its introduction into the body 11.

The embodiment of the invention shown in FIG. 3 is in a boss-fitting construction as in the case of the embodiment of FIGS. 1 and 2. Hence these parts are identified by the same reference numerals. In the case of the O-ring and retainer these parts likewise are the same as in the embodiment of FIGS. 1 and 2 except that they are suitably dimensioned to place the O-ring over the planar surface 17 of the body 11 rather than over taper surface 16. Thus in this instance a retainer ring 26 has its inner periphery terminating short of taper surface 16 and mounts an O-ring 27 in position to be compressed upon planar surface 17. A dimpled configuration of tabs 28 provides inwardly facing protuberances, as in the embodiment of FIGS. 1 and 2, cooperative with flange 15 to provide a detent connection as before described.

What is claimed is:

1. The combination in a boss and fitting assembly; of a fitting having a radially disposed flange and projecting centrally thereof a mounting extension member, a boss having an opening receiving such extension member, said flange and said boss having opposing approximately parallel surfaces and said boss having a taper surface interconnecting the said opposing surface thereon and the said opening therein, and a metallic O-ring retainer comprising a flat annular body intermediate said boss and fitting, the outer periphery of the body being formed to interengage the outer periphery of the flange on said fitting and the inner periphery being located thereby approximately at the joint of said opposing surface on said boss and said taper surface, said outer periphery of said body being formed with a plurality of portions having detent means yieldingly to grip the outer periphery of said flange, and a hollow metallic O-ring contained by and within the inner periphery of the body to be aligned with said taper surface, said O-ring exceeding in diameter the thickness of said body whereby relative advance of said fitting and said boss until limited by said body compresses said O-ring on to said taper surface establishing a seal between said taper surface and the said opposing surface on the flange.

2. A combination according to claim 1, characterized in that each of said detent means has a dimpled configuration.

3. The combination in a boss and fitting assembly; of a fitting having a radially disposed flange and projecting centrally thereof a mounting extension member, a boss having a substantially radial surface and an opening receiving said extension member, a retainer comprising a flat annular body intermediate flange on said fitting and said surface on said boss, an O-ring retained by and within the inner periphery of said body, said retainer having a plurality of portions disposed substantially perpendicularly to said flat annular body to interfit with the outer periphery of said flange whereby in conjunction with a predetermined width of the annular portion of said body to position said O-ring between said flange and said boss, said O-ring exceeding in diameter the thickness of said body whereby relative advance of said fitting and boss until limited by said body compresses said O-ring on to said boss establishing a seal between said boss and said flange, the said portions of said retainer being formed with detent means whereby said retainer may be caused yieldingly to grip said flange.

4. A combination according to claim 3, characterized in that said portions of said retainer have the form of upstanding tabs, at least some of which have a dimpled configuration to define said detent means.

References Cited by the Examiner

UNITED STATES PATENTS

| 2,041,136 | 5/1936 | Klingner | 277—181 |
|-----------|--------|----------|---------|
| 2,292,216 | 8/1942 | Doran | 313—11.5 |
| 3,139,294 | 6/1964 | Richards. | |

FOREIGN PATENTS

| 440,727 | 2/1927 | Germany. |
| 921,903 | 12/1954 | Germany. |
| 783,397 | 9/1957 | Great Britain. |

CARL W. TOMLIN, *Primary Examiner.*

C. B. FAGAN, T. F. CALLAGHAN,
*Assistant Examiners.*